Patented Jan. 12, 1954

2,665,996

UNITED STATES PATENT OFFICE 2,665,996

HYDROUS CALCIUM SILICATES AND
METHOD OF PREPARATION

George L. Kalousek, Toledo, Ohio, assignor to
Owens-Illinois Glass Company, a corporation
of Ohio No Drawing. Application March 26, 1952,
Serial No. 278,749

16 Claims. (Cl. 106—120)

This invention relates to a new hydrous calcium silicate, and to a method of preparing the same.

In the art of making hydrous or hydrated lime silicates, it has heretofore been the controlling aim to obtain a product having a desired combination of physical properties which would enable it to serve the purpose or purposes for which the product was intended. Such products have been a compromise between the available raw materials, the known processes of manipulation and the requirements of use. In general, such products have been made from mixtures of raw materials and have presented a mixture of components in their ultimate structure and composition.

It is now found that hydrous calcium silicates may be prepared of predetermined chemical composition, physical properties and other characteristics, including freedom from unreacted components or by-products, or other impurities.

In particular, I have now found that a new hydrous calcium silicate, which I have called Lepisil, may be synthesized from its components—lime, silica and water—as a substantially pure chemical compound of unique characteristic properties.

In general, I have found that preferably pure lime and silica may be caused to react with each other and with water, in aqueous medium directly to form a hydrous calcium silicate of the desired composition, and that this reaction may be controlled and carried substantially to completion.

One condition of effecting the desired reaction is that the lime and silica shall be in finely divided reactive condition—the silica especially being of a particle size sufficient to pass through a 325 mesh screen—i. e., 44 microns in diameter or finer.

Another condition of the reaction is that it shall be effected in an aqueous dispersion of the reactive solids, such that free reaction therebetween (and between intermediate reaction products) shall be provided and maintained throughout the required period of the reaction. Such dispersion, for example, should be sufficient to provide a space between the dispersed particles, which is at least equal to the average of their diameters in each direction—or a water to solid ratio of about 7:1 by volume, or greater. If the particles are separated by twice their average diameter—as by a water to solids ratio of 26/1 by volume (or about 9/1 by weight)—such degree of dispersion is desirable.

Further dispersion may be employed for the purpose of avoiding aggregation between the reactants and/or the reaction products—and thus to assure a product of small particle size.

The preparation of the new compound may be effected with anhydrous silica in the form of quartz, or with the successive grades of hydrated silicas, to and including silicic acid—and likewise with any selective mixture of such silicas as the silica component.

The lime component is preferably freshly slaked lime—and prepared with hot water, to increase the fineness and completeness of subdivision, dispersion and dissolution, which results.

The silica component is ground to a degree of fineness sufficient at least to pass a 325 mesh screen. A finer degree of subdivision may be made, as in a colloid mill, thereby to reduce the effective period of time required for its dissolution and reaction. The lime may also be similarly ground to advantage—but this appears to be less necessary, especially when prepared as above described, on account of its greater and more rapid solubility in water.

Quartz

In carrying out the synthesis of Lepisil with quartz, the finely divided lime (99.7% CaO) obtained by igniting pure $CaCO_3$ at 1150–1200° C., for 2 to 4 hours—and finely divided quartz (99.8% $SiO_2$) may be mixed dry and the mixture dispersed in the required volume of water; or the lime may be first slaked or hydrated and dispersed in water and added to a separately prepared aqueous dispersion of the quartz.

The proportions used will be accurately weighed out in amounts as indicated by the molecular ratios of the equation:

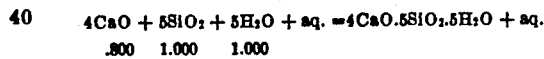

The water component is sufficient to present a water/solids ratio of at least 7:1 by volume—or about 3/1 by weight, taking the specific gravity of lime at 3.4 and of quartz as 2.2–2.66—but preferably a degree of dispersion several times greater—for example about 26/1 by volume or 9/1 by weight, or higher, is employed.

The dispersion of the solids may be maintained by agitation or by the addition of a small amount of inert finely divided fibrous material, such as paper pulp which is subject to subsequent removal in various ways, as by ignition.

The charge, preferably in dispersion and while still hot, as above prepared, is then subjected to an elevated temperature—above the boiling point of water (125° C.–200° C.)—and to an increased pressure, accordingly, to prevent ebullition—as in an autoclave. The container for the liquid dispersion may be uncovered in the autoclave, or closed as desired. Accordingly, the dispersion may be spontaneously preserved, even though quiescent, as above pointed out, or may be maintained by mechanical agitation or by revolving the container or the autoclave itself. The atmosphere of the autoclave is preferably provided with a slight excess of water and maintained with a saturated or slightly supersaturated atmosphere—thereby to assure a maintained or expanding dispersion and avoid a contracting degree of disperson or segregation.

A preferred autoclaving treatment is effected by heating up to 175° C. over a period of 1 to 2 hours and then maintaining this temperature for a period of 6 to 8 hours—or overnight for 16 hours. At the end of the heating period, the autoclave is cooled to room temperature over a convenient period—e. g., of 1 hour or less in the overnight runs, or 8 to 10 hours in the shorter runs—and then opened to the atmosphere.

The product may then be dried either at 150° C., in a properly ventilated oven or by washing it repeatedly in acetone, followed by ether and finally drying for an hour at 100° C.

In such procedure, it is found that the lime first goes into solution, as would be expected, and that it acts and reacts upon the dispersed quartz—first to produce, with the thus dissolved quartz—a solubility product probably in the form of silica chains, each associated with a molecule of lime which serves as an instigator and preserver of its dissolution. Such silica chains react, in solution, with more lime to produce a gelatinous phase as a precipitate, which I have denominated Phase A and which has a definite chemical composition represented by the formula:

$$2.0CaO.1.0SiO_2.xH_2O. \quad (x=2 \text{ or more})$$

The formation of this preliminary reaction product and its continued presence in the reaction mixture are predicated upon the provision of an excess of lime over silica. Such critical excess may be and probably is the dissolved lime—relative to the dissolved silica. It apparently requires the presence of free solid lime—though, of course, as long as there is free solid lime, this assures a saturated solution of lime. As soon as all of the solid lime is dissolved as such, though reaction continues, the concentration of the saturated solution of free lime will fall.

Likewise, under such conditions, two other hydrous dicalcium silicates have been observed—though in minor amounts—and been separated. I have designated these compounds as Phase B and Phase C—which have compositions as indicated by the formulae:

*Phase B.*—$2CaO.SiO_2.H_2O$, fibrous crystals.
*Phase C.*—$2CaO.SiO_2.1.2H_2O$, platy crystals.

The Phase A compound, upon being subject to thermal analysis, manifests an endothermic reaction which is gradual and takes place between 400° C. and 600° C., with a maximum at about 530° C. Phase B exhibits a sharp endothermic reaction at 570° C. and Phase C exhibits a sharp endothermic reaction at 480° C. Phase A compound is also characterized by its capacity to react further with silica chains or residual particles of silica itself to form lime-silica compounds or hydrous calcium silicates of lower $CaO:SiO_2$ ratios, ultimately to completion at a point corresponding to the proportions of reactive lime and reactive silica present.

Upon disappearance of solid lime therefore, by solution and reaction, the resulting hydrous calcium silicates—Phase A, especially, but also Phase B and Phase C—if present—undergo further reaction. Such reaction is effective to continue the general dissolving and reaction effect with respect to the residual silica—whether the latter is dissolved or is still present as residual quartz particles—resulting in a series of intermediate reaction compounds, which may be represented as follows:

$$Ca(OH)_2 + SiO + H_2O$$

$2CaO.1.0SiO_2.xH_2O.$  Phase $A + Ca(OH)_2$..{With or without Phase B or Phase C, or both.
$(x=2 \text{ or more})$
$1.25CaO.1.0SiO_2.xH_2O + H_2O + SiO_2$
$1.00CaO.1.0SiO_2.xH_2O + H_2O + SiO_2$
$4CaO.5SiO_2.5H_2O. + H_2O$ (substantially complete reaction to Lepisil)

Silicic acid

In carrying out the process of the invention with silicic acid, as the silica component, the reactants and reaction mixture are prepared in substantially the same way, and an equivalent degree of dispersion in water is effected.

The charge of dispersed finely divided reactive lime and finely divided reactive silicic acid is subjected to heating, in an autoclave or the like. In heating up to 175° C, it is found that in 1 or 2 hours, a preliminary reaction is effected which is somewhat different from that with quartz as the silica component.

The effective lime: silica ratio or free lime potentiality of such a reaction mixture does not appear to be so great as with quartz particles. This is due to the hydrated condition of the silicic acid which presents a greater (solid) surface area, and one which is more reactive, both to absorb or to adsorb and to combine with the solid and dissolved lime, more rapidly and in greater proportion. Such proportion is probably not limited to valence as in the silica chains or in the Phase A compound which is formed in dispersions of lime and quartz.

Thus, after 1 hour's heating up of the mixture, it is found to consist of a mixture of a compound having the composition $1.25CaO:1.0SiO_2.XH_2O$, some unreacted silica, and a lime-silica gel. The reaction mixture is characterized by being without any free solid lime.

This lime-silica gel composition, upon being subjected to thermal analysis, manifests an exothermic reaction which may occur between 400° and 750° C. It is not sharp at a given temperature but gradual over a considerable temperature range.

Continued autoclaving at this temperature (175° C.) for 1 or 2 hours, effects the transformation of most of the original reactants, by reaction of the lime-silica compounds with the residual silicic acid and with one another, to the composition $1.0\ CaO.1.0.SiO_2.XH_2O$. After about 5 to 7 hours such transformation (with reference to the lime component) is substantially complete. But this intermediate compound is still associated with residual silicic acid in the reaction mixture—and reaction takes place between them, though more slowly, so that in about 24 hours, the transformation to Lepisil $4CaO.5SiO_2.5H_2O$ is about 50% to 75% complete—and after 4 days, little if any of the original reactants, or intermediate by-products is present.

However, it is sometimes found that there may be a small amount of silicic acid, gyrolite or Xonotlite still present. This is attributable to the slower action and subsequent retarding effect of the silicic acid which tends to stabilize the intermediate product $1CaO:1SiO_2.XH_2O$. By increasing the lime content of the original raw mixture of lime and silica by only .25%—or from a $CaO:SiO_2$ ratio of .80:1.00 to .82 to 1.00—the transformation of the charge to Lepisil is substantially completed.

The transformation reactions of lime, silicic acid and water to Lepisil may be represented as follows:

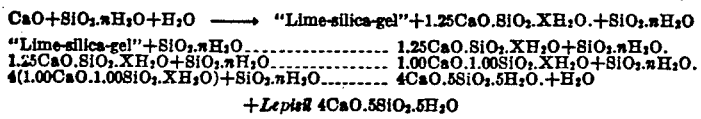

$$CaO+SiO_2.nH_2O+H_2O \longrightarrow \text{"Lime-silica-gel"}+1.25CaO.SiO_2.XH_2O.+SiO_2.nH_2O$$
$$\text{"Lime-silica-gel"}+SiO_2.nH_2O \longrightarrow 1.25CaO.SiO_2.XH_2O+SiO_2.nH_2O.$$
$$1.25CaO.SiO_2.XH_2O+SiO_2.nH_2O \longrightarrow 1.00CaO.1.00SiO_2.XH_2O+SiO_2.nH_2O.$$
$$4(1.00CaO.1.00SiO_2.XH_2O)+SiO_2.nH_2O \longrightarrow 4CaO.5SiO_2.5H_2O+H_2O$$
$$+ Lepisil\ 4CaO.5SiO_2.5H_2O$$

Lepisil $4CaO.5SiO_2.5H_2O$

As obtained by either procedure, whether from quartz or silicic acid or other intermediate form of silica—from anhydrous to hydrous—the composition of Lepisil is chemically and physically the same. Upon thermal analysis, it exhibits a small but prolonged endothermic reaction or "break" in the heating curve, at $260° \pm 10°$ C.

But it is to be observed that this constitutes the only break—upon subjecting Lepisil to thermal analysis—from the rise of temperature imposed, whether at lower or higher ranges of temperature. This is a very significant and characteristic property, therefore, of this compound and is unique in identifying it or its presence.

Upon X-ray analysis, it manifests the following unique and characteristic pattern:

| Intensity | $d$ in Å. |
|---|---|
| VS | 11.2 |
| M | 5.4 |
| W | 3.49 |
| W | 3.30 |
| VS | 3.07 |
| S | 2.95 |
| S | 2.79 |
| W | 2.51 |
| W | 2.41 |
| W | 2.24 |
| W | 2.13 |
| W | 2.06 |
| W | 1.99 |
| S | 1.831 |
| M | 1.664 |
| W | 1.615 |
| M | 1.529 |
| VW | 1.433 |
| VW | 1.399 |

VS=Very strong; M=Medium; W=Weak; S=Strong; VW=Very weak.

It may be pointed out that: with quartz as the source of the silica component, the reaction is apparently progressive dissolution of silica into a concentrated alkaline medium and formation of a high $CaO/SiO_2$ ratio compound which forms a $2CaO.SiO_2XH_2O$ gelatinous precipitate, Phase A—which is, in turn, subject to a subsequent sequence of reactions with the residual quartz, to equilibrium or completion—with silicic acid as the source of silica the reaction mixture first tends to form an initial gelatinous precipitate, a portion of which quickly absorbs all of the lime from solution, and this gel then reacts with the residual silicic acid gel and solution (with characteristic properties and chemical physical reactions accordingly)—but much more slowly in reaching an equilibrium or in going to completion. Compounds of intermediate composition, degree of hydration and other properties, or mixtures of them will vary accordingly between the reactions and results obtained with quartz and silicic acid, per se.

While, as indicated above, Lepisil is formed most rapidly at $175°$ C., it may be diverted by conducting the reaction very much above $175°$ C. Thus, it may also be formed at $200°$ C. more rapidly but with increased dangers of partial formations of gyrolite or Xonotlite. On the other hand, at lower temperatures, the speed of reaction is slower—being reduced by approximately one-half at $162°$ C., and requiring 15 to 20 hours for a comparable degree of completion—and at $125°$ C.—2 to 4 weeks.

The product is characteristically formed, by the described procedure, in finely divided form, as crystals of very thin flaky characteristics, and a surface area, as determined by the gas adsorption method, of about 50 square meters per gram.

Lepisil is therefore a new hydrous calcium silicate of definite chemical composition—$4CaO.5SiO_2.5H_2O$—of a thin flaky, crystalline habit, finely divided and presenting a high specific surface area, substantially free from impurities whether of the initial reactants from which it is made or of intermediate by-products of the reaction. It manifests a novel and unique X-ray pattern, with new lines therein, not shown by any other of the known hydrous lime silicates. It is stable, at ordinary and normally elevated temperatures, and exhibits an endothermic, specific reaction at $260° \pm 10°$ C.—upon thermal analysis. Upon re-heating the same sample again, however, to this temperature—this thermo reaction is not repeated.

The product is, therefore, useful wherever a crystalline solid of definite composition is required, or one which has a high specific surface area, identifiable temperature characteristics and X-ray pattern—freedom from free alkalies, free silica, water, or other associated materials—and dependable as a basis of reference with respect to lime-silica-water syntheses, generally—their degree of progress or completion.

While the procedures above described are in terms of an initial reaction mixture containing the lime and silica components in substantially the molecular proportions required to produce the ultimate product, Lepisil—by continuous treatment of the same, it is to be understood that the procedure may be effective stepwise. That is, the lime and silica components may be reacted in appropriate proportions substantially completely to produce, for example, the composition of Phase A (with or without Phase B or C) or other predetermined intermediate when using quartz as the silica component, or to produce the "Lime-silica gel" or other predetermined intermediate, when using silicic acid as the silica component—and thereafter, in a second stage, the intermediate may be reacted with additional proportions of silica component and under appropriate conditions to effect the required molecular ratio of $4CaO.5SiO_2.$ to form Lepisil $$4CaO.5SiO_2.5H_2O$$

For example, somewhat different sources of the lime and silica components may be employed, instead of or supplemental to free lime and free silica, as above-described. The lime and silica may be already combined, but the resulting compound must be reactive, in aqueous medium, with other components of the reaction mixture and in suitable proportions to form Lepisil. Thus, high lime silicates, such as beta-$2CaO.SiO_2$, gamma $2CaO.SiO_2$ or $3CaO.SiO_2$, in suitably finely divided condition and in the presence of sufficient water, are susceptible to reaction with silica in the form of quartz or silicic acid, or the like— if the reaction mixture presents a $CaO:SiO_2$ molecular ratio of 0.8:1.0. Accordingly, certain appropriately prepared blast furnace slags (which may consist in large part of beta $2CaO.SiO_2$) may be found suitable for the synthesis of Lepisil, to constitute at least a major phase of the resulting product.

It should be understood that the present disclosure is for the purpose of illustration only and that this invention includes all modifications and equivalents which fall within the scope of the appended claims.

The foregoing constitutes the specification of my application Serial No. 12,692, filed March 2, 1948, now abandoned, of which this application is a continuation-in-part.

Supplementary to my said disclosure, it is further found that Lepisil crystals, as therein synthesized, may be simultaneously caused to integrate to a unified body structure, if it is so desired. That is the crystals may be caused to grow together to form an integrated porous product of continuous solid formation, the density of which is controllable: by the dispersion of finely divided fibers (such as of asbestos or cellulose fibers) in uniform distribution throughout the mixture (thereby to effect a substantially static dispersion and suspension of the solids); by avoiding agitation of the mixed charge during the integrating portion of the reaction; and/or further, by regulating the water to solid mixtures—that is to say, restricting the volume of the mixture within which the reaction is caused to take place to an overall volume which the synthesized reaction product is competent to occupy in continuous integrated formation and of the required strength—which will, ordinarily, be downwardly from a water to solids ratio of approximately 26:1 by volume or 9:1 by weight. Such conditions and procedures permit the reaction to proceed and the synthetic product to grow by accretion and ultimate contact and union of its crystals, so as to constitute a continuous synthetic integrated crystalline structure of the substantially pure Lepisil compound, without other bonding agent, while maintaining such static dispersion throughout the volume of the mixture and throughout the time of the integrating reaction of the reactant components of the charge until substantially complete reaction thereof has been effected throughout the entire volume of the reactive mass.

Shaped and integrated Lepisil or Lepisil-bonded Lepisil products generally may be utilized as insulating and structural materials and particularly where volume stability is desirable at high temperatures, i. e., temperatures in excess of 600° F. However, they may also be used in the lower temperature fields and for other purposes where the inert, porous, and like properties of Lepisil are desired or required.

A novel and characteristic feature of such structures of integrated synthetic Lepisil is that not only the crystals of Lepisil but the planes or surfaces of contact and union at and through which they are bonded together into a unified structure are of continuous, homogeneous composition. Conversely, such bodies are free from the necessity or presence of any other bonding medium or material. They are also substantially free from unreacted reagent materials or by-products—for all of the reagent materials are reacted into the formation of Lepisil and no by-products are formed or reagent materials left to constitute a component of the finished product.

In making a shaped integrated product comprising a porous body structure, which body consists essentially of pure, synthesized crystals having the formula $4CaO.5SiO_2.5H_2O$, or a combination of said crystals and other known crystals (which may have been added for dispersion and suspension of the solids or like purposes, but which are not reactive per se and do not interfere with the reaction of the reactive lime, silica and water components, such as the fiber component of asbestos crystals, cellulose fibers or the like), the previously described process (without agitation) can be carried out. The crystals of the compound thus formed may be and are continuously integrated with each other without any other bonding medium to thereby form a three-dimensional network interspersed with voids and may have the aggregate volume of voids less than or greatly in excess of that of the crystals. However, it will be necessary to regulate and control the basic ingredients, the water to solids ratios and other relationships between the components of the mixture such as a maintained and uniform dispersion and suspension of the reactants (as by the use of highly spiculated asbestos or cellulose fibers or other means known to the art), during the reaction and integration, as well as the time, the pressures and/or temperatures utilized.

There are several factors that govern in the preparation of $4CaO.5SiO_2.5H_2O$, for example:

(1) *Composition.*—The $CaO/SiO_2$ ratio of the raw mix must be approximately 0.8 $CaO:1.0SiO_2$.

(2) *Form of silica and lime.*—Finely ground quartz must be used in order to produce the Lepisil in a pure form or condition, and should be used if the desired product is to be obtained in practicable time. The use of silicic acid greatly retards the final formation of the desired product, although the initial rate only of the reaction is markedly more rapid with the silicic acid. By analogy the diatomities may be assumed to behave similarly as the silicic acid.

In addition, it is pointed out that the lime and silica components may in part be already in combination with each other and yet be capable of entering into the reaction to produce Lepisil. For example, finely divided Portland cement, typically containing lime and silica in combination and in a ratio of about 2.5 $CaO:1.0$ $SiO_2$, may serve as a source of reactive lime and reactive silica, to the amount and in the ratio of its specific lime and silica contents.

In fact, such association of lime and silica, as it appears in Portland cement, seems to render both components especially reactive, and particularly so when very finely ground.

Moreover, it is further found that all of the reactive lime component of the reaction mixture may be introduced in the form of finely divided Portland cement and that other high lime: silica ratio compounds, in which the lime and silica components are similarly suitably reactive with reactive quartz or silicic acid in an aqueous medium, may likewise be so employed.

(3) *Temperature.*—Under optimum conditions, the temperature of 175° C. is sufficiently high for completion of the reaction in about 8 hours. Increasing the temperature accelerates the reaction but some uncertainty may exist as to the purity of the product. It is preferable that the temperature not exceed 200° C. and that the desirable range is downwardly therefrom to approximately 125° C.

(4) *Time of induration.*—Increasing the temperature has the effect of accelerating the rate of the reactions. The relation between these two factors may be predetermined, and such is the case but only if certain of the other factors remain unaltered. For example, raising the temperature of a quartz mixture to a relatively high level (e. g. above 200° C.) does not appear to have the desired effect of converting the lime and quartz completely to $4CaO.5SiO_2.5H_2O$—instead, the formation of some other crystalline compound is favored, such as $5CaO.5SiO_2.H_2O$.

(5) *Proper suspension and mixing.*—This factor comes into play at all densities. It is observed that the rates of reaction are decreased at densities of about 30-40 pcf. in the preparation of $4CaO.5SiO_2.5H_2O$. A water to solids ratio of 3:1 by weight is preferable so far as speed of reaction is concerned as lower ratios lead to retardation of the speed of reaction.

In a consideration of the factors discussed, it follows that if one is changed (except the ratio of effective reactive lime to effective reactive silica $CaO/SiO_2$ for the given product, Lepisil, which in terms of its formation has to be fairly rigidly fixed) another usually has to be altered in order that the reaction proceeds to the desired state and/or composition.

In carrying out the synthesis of Lepisil in porous structural form with quartz, the finely divided lime and finely divided quartz may be mixed dry and the mixture dispersed in the required volume of water; or the lime may be first slaked or hydrated and dispersed in water and added to a separately prepared aqueous dispersion of the quartz. The slurry of lime, as prepared, may be at elevated temperature—or both the lime slurry and dispersion of quartz may be at substantially elevated temperature. The resulting mixture, as thus freshly prepared and at high temperature, is then brought to the shape and dimensions desired in the finished integrated product to be made therefrom.

The proportions used will be accordingly weighed out in the amounts as indicated by the molecular ratios of the equation:

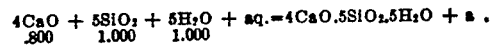

The water component of the lime-silica mixture will usually range from approximately 9/1 by weight, downwardly depending upon the density desired in the end product.

The dispersion of the solids may be effected by agitation and also by the addition of inert finely divided fibrous material. For example, asbestos fibers which are separated longitudinally to a sufficient degree—such that the individual fibrous filaments resulting present cross-sectional dimensions of the order of $\frac{1}{16}$ to 3 microns, in either width or breadth, and which in length may be of different orders—but characteristically fibrous by being of appreciably greater length than thickness—and, also cellulose fibers of similar characteristic or dimensions, are especially effective in providing and maintaining the static dispersion and suspension of the finely divided reactant solids and reaction products thereof in aqueous media such as water or aqueous solutions.

The charge as thus prepared is shaped and maintained in uniform quiescent or static dispersion and while still hot as above prepared is then subjected to an elevated temperature—above the boiling point of water (150° C., 54 p. s. i. gauge or 69 p. s. i. abs.-200° C., 211 p. s. i. gauge or 226 p. s. i. abs.)—and to an increased pressure, accordingly, to prevent ebullition—as in an autoclave. The container for the liquid dispersion may be uncovered in the autoclave, or closed as desired.

The atmosphere of the autoclave is preferably provided with a slight excess of water and maintained with a saturated or slightly supersaturated atmosphere—thereby substantially avoiding a loss of water and the resultant shrinkage of the charge.

A preferred autoclaving treatment is effected by heating the shaped or molded charge quickly and throughout, to the desired reaction temperature—for example, 175° C. at which it is held over a period of 6 to 8 hours—or overnight for 16 hours. At the end of the reaction period, the autoclave is cooled to room temperature over a convenient period, e. g., of 1 hour or less in the overnight runs, or 8 to 10 hours in the shorter runs—and then opened to the atmosphere.

The range of temperature and time for indurating these products of various densities should preferably be temperatures from 150° C. to about 200° C. and time intervals ranging and depending inversely upon the temperature being utilized.

The integrated porous product may be dried at temperatures in the range from 300°-350° F., depending upon the density of the product. Owing to the high porosity and strength of the product, by integration of the reaction product, Lepisil, it is found that as such reactions and the integration of the mixture progress—from the outside of the mass inwardly—as soon as the outer portions attain a self-sustaining consistency, vaporization and evaporation of the water component therefrom may be permitted and promoted so long as they do not proceed too rapidly nor ahead of or beyond the development of such conditions—according to the principles of simultaneous induration and drying of lime-silica-water reaction mixtures as set forth in U. S. patent to Neo S. Serinis 2,534,303.

Thus, it will be apparent that by proper control of the molecular ratio of the lime-silica components at .8, the conversion temperature and the time intervals of the conversion, that a porous integrated structure may be produced, the body of which may be composed of an integrated structure of Lepisil without other or residual unreacted raw materials or reagents or by-products.

In the adaptation of the invention to the production of shaped and integrated Lepisil products, such as molded heat insulation, it is found that the compositions employed in terms of $CaO$ and $SiO_2$ may advantageously be from 0.800 to 0.825 mol of $CaO$ to 1 mol $SiO_2$, the final results being about the same through this range.

For example, the amounts of raw ingredients—industrial quicklime (containing 94 per cent $CaO$) quartz flour with about 96 to 98 per cent passing the No. 325 screen and containing 99.8 per cent $SiO_2$ or lime and silica in the form of Portland cement and different grades and kinds of asbestos—are used as follows for a product having a density of 20 pounds per cubic foot:

|  | 0.80CaO/SiO$_2$ | 0.825CaO/SiO$_2$ |
|---|---|---|
| Quicklime, pounds (CaO) | 200 | 200 |
| Quartz, pounds | 208 | 200 |
| Chrysotile, 6D grade, pounds | 14.5 | 14.2 |
| Amosite, pounds | 14.5 | 14.2 |
| Water, pounds | 1,491 | 1,465 |
| Water/Solids Ratio | 3:1 | 3:1 |

When a part of the lime and/or silica components, which are to be used as raw materials, are already in combination with each other, as in Portland cement, for example, the amounts to be used will be apportioned in terms of such combination and of the reactive lime and reactive silica contained therein. Thus for example 100 parts of Portland cement may be used with 62 parts of quartz to provide a reactive $CaO:SiO_2$ ratio of .80:1.0 or with 60 parts of quartz to provide a reactive $CaO:SiO_2$ ratio of .825:1.0.

The quicklime is hydrated in four times its weight of hot water (about 130° to 170° F.) using a mixer for agitation. The remainder of the water, being in the form of a 5 to 10 per cent slurry with the asbestos, is then added, which is followed by the addition of the quartz flour. After all of the ingredients have been added, the mixture is agitated for an addtional five minutes. The resulting slurry is then poured into pans, of the desired size and shape, and autoclaved at a steam pressure (gauge) of 125 pounds per square inch (178.3° C.) for 8 hours, or at 220 pounds per square inch (201.9° C.) for 5 hours.

The asbestos fiber, as prepared for use, is treated as a 5 to 10 per cent water suspenson in a hydrapulper, to separate and spiculate the same to finely divided forms, in respect of the individual discrete fibers. By "spiculate" is meant the separation of the asbestos fibers, or reduction of size of the cellulose or other fibers used, to a very fine diameter of the order of .1 to 3.0 microns, without destroying the characteristic of the individual fiber being at least several times as long as its cross-sectional dimensions. Both the degree of spicualtion and the amounts used are dependent on a number of factors. The spiculated asbestos is especially effective for suspending the solids—while the addition of asbestos in all forms imparts hinging strength and prevents cracking during drying.

To make an integrated Lepisil product of lower density, as for example 10 pounds per cubic foot, the above procedure may be followed except that the asbestos used would be spiculated to a high degree of separation of the fibers. Also, a relatively high percentage, up to 20 per cent of long fiber asbestos might be found necessary or advantageous to afford the desired hinging effect and strength. The ratio of water to solids used in the mixture would also be increased to 6.0 to 6.2 parts of water by weight, to each part by weight of solids, for finished products of such lower apparent density—e. g. 10 pounds per cubic foot.

For integrated products of lower apparent densities, reaction mixtures of the reactive lime, reactive silica and inert spiculated fiber and/or ordinary fibers added for their hinging effect, etc., may be prepared of higher water/solids ratios, by weight or volume, to such degree as the resulting attenuated forms of the synthesized Lepisil crystals are capable of entering into a unified structure of the desired continuous uniformity and strength.

After integration of the charge has been effected to a degree sufficient to effect a self-sustaining consistency throughout the volume of the charge, the water component may be caused or permitted to evaporate and such evaporation may be conducted rapidly and to substantially any degree of residual moisture desired—or to complete dryness, if required. Such evaporation may commence before chemical reaction between the reactive components of the charge is complete such as set forth in Serinis' U. S. Patent 2,534,303 above mentioned—or complete chemical and physical reaction may be completed and then followed by drying.

From the preceding it will be apparent that the specific compound, Lepisil, $4CaO.5SiO_2.5H_2O$ may be synthesized in discrete particle form or in pure crystalline porous structural form, thereby to provide insulation material for use in connection with temperatures in excess of 600° F. or below same.

However, of course it will be considered and is contemplated that circumstances alter cases and that necessity or convenience may suggest or dictate variations from the preferred procedures, compositions and resulting products to be obtained as above described. Pure quartz, while obtainable, may be used for ancillary reasons, such as economy of cost. Less pure, though virgin raw materials may be preferred—or intermediate products or by-products as above described may be chosen—and the resulting chemical and physical reactions of the process may and will be modified accordingly. In such event, the products thereby obtained may contain consequent impurities from the raw materials, intermediate or by-products used—or may present variations due to the modification of the reactions or a less complete reaction to Lepisil and conversion to crystal formation or integrated solid bodies. Such products may not be, for example, completely free from other and different substances than pure Lepisil crystals or aggregates. But such variations in materials, procedures and reactions, and in the product obtained, are to a considerable degree in the domain of optional variation, at the will of the individual operator and to such extent as such variations lead to an equivalent function and/or result are to be construed as nonetheless embodying applicant's invention in respect of the main disclosures and recommendations of raw materials, process steps, reactions and product or products formed, as herein set forth, disclosed and claimed.

Likewise, while spiculated fibers, as of asbestos and cellulose, described and defined above, are predominantly effective and recommended for purposes of dispersion of the finely divided solid reactants of the charge—whether discrete crystals of Lepisil or integrated bodies of the reaction mixture or charge are desired to be produced—it is to be understood that ordinary asbestos fibers and cellulose fibers may be added for their usual and customary purpose and function of lending strength and toughness, and the so-called "hinging effect" when incipient cracks occur, in solidified products, to prevent developing or complete rupture of the mass in which they are embedded.

The foregoing constitutes the specification of my application Serial No. 277,298, filed March 18, 1952, now abandoned, of which this application is a continuation-in-part.

It has also been found, as disclosed in my issued United States Patent No. 2,547,127, that equimolecular proportions of reactive lime and reactive silica, dispersed in water and subjected to reaction conditions of elevated temperature and pressure (173.5° to 208° C. and above) will react substantially quantitatively to produce, synthetically, crystalline Xonotlite, having the molecular composition 5CaO.5SiO$_2$.H$_2$O. These crystals are of a lath-like habit of growth and are capable of intergrowth in the form of shaped and integrated masses, in a wide range of apparent densities, which depend inter alia upon the concentration or water/solids ratios, by volume, of the reactive lime and reactive silica components in the original and reacted reaction mixtures.

As disclosed in applicant's copending applications and patent above mentioned—the procedure of providing and preparing a reaction mixture of finely divided reactive lime, finely divided reactive silica and water (in which the water component is saturated with the dissolved lime at the outset and so maintained) and subjecting to reaction conditions of temperature and pressure, effects the reaction between the lime, silica and water components uniformly and completely, with stoichiometric conversion to Lepisil 4CaO.5SiO$_2$.5H$_2$O (if the reactive CaO:SiO$_2$ ratio provided is 4:5) or to Xonotlite, 5CaO.5SiO$_2$.1H$_2$O (if the reactive CaO:SiO$_2$ ratio provided is 5:5) substantially exclusive of residual lime or silica or reaction by-products.

By the present invention it is discovered that if a reaction mixture of finely divided reactive lime and finely divided reactive silica and water is provided in which the reactive CaO:SiO$_2$ ratio is between 4:5 and 5:5 (and the water component is saturated with respect to the lime component in solution at the beginning and so maintained)—then substantially all of the lime component may be progressively and continuously dissolved and reacted with the silica component initially to form the reactive intermediate compound Phase A—2CaO.SiO$_2$.$n$H$_2$O, and through a sequence of reactive hydrous silicates of lime, to the formation of Lepisil 4CaO.5SiO$_2$.5H$_2$O, and crystallization of Xonotlite 5CaO.5SiO$_2$.H$_2$O.

It is to be understood that in order to produce these contemplated products wherein the two compounds 4CaO.5SiO$_2$.5H$_2$O and 5CaO.5SiO$_2$.H$_2$O are found present therein in ingrated form and in controlled predetermined quantity, the starting slurry must be one wherein the molar ratio of lime to silica is the major controlling factor with respect to the final results to be obtained in the end product and through the reaction of the slurry during a given period of time and at a given pressure.

In accordance with applicant's present invention, therefore, a reaction mixture is prepared of finely divided reactive lime (including reactive compounds of lime and silica of high CaO:SiO$_2$ ratios such as those of the type of Portland cement) finely divided reactive silica, including quartz, silicic acid and like hydrous silica compounds and reactive compounds of lime and silica, of the type of Portland cement, and water—in which the water component is initially saturated with respect to the lime component in solution and in which the CaO:SiO$_2$ ratio is above 4:5 and below 5:5—and the temperature is raised to the minimum reaction temperature of the mixture (about 175° C. and 130 p. s. i., abs.; 115 p. s. i. gauge) to form with quartz the compound Phase A, 2CaO.SiO$_2$.$n$H$_2$O with respect to substantially the complete reactive lime component of the mixture, and to cause the resulting high CaO:SiO$_2$ ratio lime silicates to react progressively and successively with the reactive silica component of the mixture and with each other, to effect the formation of Lepisil, 4CaO.5SiO$_2$.5H$_2$O and Xonotlite, 5CaO.5SiO$_2$.H$_2$O.

Such reaction results in an integrated, intimate and uniform mixture of the dispersion of platelike crystals of Lepisil as formed and the formed long, thin lathlike crystals of Xonotlite forming a characteristic open, porous, crystalline structure which is strong, resilient, refractory to high temperatures and of low heat conductivity throughout the solid, integrated mass as a whole. These novel properties and characteristics are due partly to the physical properties and relationships of the crystals, their dispersed intergrowth, and also their individual respective chemical compositions, and unique thermal characteristics and heat conductivities. Lepisil, being highly hydrated presents a high thermal capacity and resistance to the reception and transmission of heat. Xonotlite, being of low hydration is resistant to very high temperatures, strong and relatively inert both chemically and physically. Both are formed in fine grained crystalline structure, interspersed by finely divided, dispersing and dispersed voids.

Advantage can be taken of the procedure disclosed in U. S. Patent 2,534,303 to Neo S. Serinis, whereby raw mixtures of the stated range of CaO:SiO$_2$ ratios can be indurated and dried in a greatly shortened period of time over that required for the conventional method of separate autoclaving and separate drying steps in the process.

The product obtained consists exclusively of integrated Lepisil and Xonotlite crystals, and consequently free from any other by-products or additional bonding media. The overall apparent density of the charge and of the integrated products formed thereof, will be determined by the water/solids ratio of the original mixture, since a fine void structure results from the expulsion of water from the highly dispersed crystal structure.

The dispersion of the solid reactants in the aqueous reaction mixture may be provided and sustained throughout the reaction and ultimate integration of the charge as a whole by the addition of suitable suspending agents and more especially finely divided fibrous materials, of the order of .1 to 3 microns in diameter, such as spiculated asbestos, cellulose or the like as set forth in U. S. patent to Lewis H. D. Fraser, 2,469,379 of May 10, 1949, Reissue 23,228 May 9, 1950.

While the immediately foregoing description and discussion of the Lepisil-Xonotlite mixtures, reactions and resulting products is related to the use of quartz as the silica component it is to be understood that when using tripoli, silicic acid or other forms of silica as the starting material, similar progressive reaction will be initiated and pursued by following applicant's present procedures. In such cases, a longer period of time may be required to effect completion of the reaction to Lepisil and/or to Xonotlite, due to the physical effects of the originally hydrated and more gelatinous condition of the reactive silica component, but the ultimate product will consist substantially of Lepisil and Xonotlite crystals, integrated with each other and without residual lime or silica or by-products of the reaction.

As previously stated herein the primary purpose of this present invention is the production of an end product for use as either building or thermal insulation wherein at least two compounds are combined in predetermined proportions suitable for certain desired end purposes.

The percentage of the individual compounds present in the end product are predetermined and controlled through control of the molecular ratio of lime to silica in the starting slurry.

For example, in the use of tripoli, as the form of silica to be used, the following Table I indicates the procedure to be followed to produce end products in which the percentage of the compounds present therein are predetermined and controlled. This table also indicates specific examples of procedures in accordance with the present invention for the preparation of integrated Lepisil-Xonotlite refractory insulation, the time intervals given therein being those necessary in an ordinary indurating cylinder.

Table I

| Product | | Starting ratio CaO/SiO$_2$ | Time, hrs. | Pressure (p.s.i.) | |
|---|---|---|---|---|---|
| 4CaO.5SiO$_2$.5H$_2$O, percent | 5CaO.5SiO$_2$.H$_2$O, percent | | | Gauge | Abs. |
| 100 | 0 | 0.8 | 7 | 225 | 240 |
| 75 | 25 | 0.85 | 7–9 | 225 | 240 |
| 50 | 50 | 0.90 | 9 | 225 | 240 |
| 25 | 75 | 0.95 | 1' | 225 | 240 |
| 0 | 100 | 1.0 | 11 | 225 | 240 |

From Table I above it is apparent that as the molecular ratio increases the time for conversion to a completely crystalline product at a given pressure also increases in some proportion thereto. An indurating pressure of 225 p. s. i. (gauge) or 240 p. s. i. (abs.) and temperature of 203° C. appears to be a commercially practical pressure economically common to all CaO/SiO$_2$ ratios but pressures and their corresponding temperatures beyond this may be also utilized.

The time intervals required at a given pressure to obtain a completely crystalline product are somewhat shorter when quartz is used than when tripoli or silicic acid is employed as the source of silica.

It should be understood that the present disclosure is for the purpose of illustration only and that this invention includes all modifications and equivalents which fall within the scope of the appended claims.

The use of the terms, "silica," "reactive silica" or "siliceous material" in this present specification and/or any of the claims, contemplates the inclusion of silica in any of its known forms, either free, combined or chemically combined as silicates.

I claim:

1. An integrated porous hydrous calcium silicate product, consisting essentially of two crystalline structures, one of said crystalline structures having the composition 4CaO.5SiO$_2$.5H$_2$O, and the other crystalline structure having the composition 5CaO.5SiO$_2$.H$_2$O being present and combined with said first mentioned structure, the said crystalline structures being continuously integrated with each other in random dispersion, and forming a three-dimensional network interspersed with voids, the aggregate volume of the voids being in excess of that of the crystals.

2. A hydrous calcium silicate product in shaped form, consisting essentially of a combination of two continuously integrated crystalline structures, said combined structures having voids in excess of the solids and its said structures having the compositions 4CaO.5SiO$_2$.5H$_2$O and 5CaO.5SiO$_2$.H$_2$O 3. A reaction product, consisting essentially of dispersed finely divided fibers and dispersed thin platy crystals, having a composition of 4CaO.5SiO$_2$.5H$_2$O and characterized by a unique X-ray diffraction pattern having a very strong line $d=11.2$ Å. and a strong line at $d=2.95$ Å., and dispersed lath-like crystals, having a composition of 5CaO.5SiO$_2$.H$_2$O, said crystals being integrated in continuous random arrangement relative to each other.

4. The method of forming an integrated hydrous calcium silicate product which comprises providing an aqueous mixture consisting essentially of reactive lime and reactive silica, wherein the molar ratio of lime to silica is within the range of from at least 4:5 to less than 5:5, the amount of water in the mixture being within the range of about 7.0 to .75 times the aggregate weight of the solids, subjecting said mixture to a temperature and pressure in excess of 175° C. and 130 p. s. i. abs. respectively, maintaining said slurry at a temperature and for a period of time necessary to effect substantially quantitative reaction between the reactive lime and silica components, thereby to produce an amount of at least two crystalline structures in integrated form, the percentage of each structure being dependent upon the molar ratio of lime to silica in the slurry, one crystalline structure having the composition 4CaO.5SiO$_2$.5H$_2$O and one having the composition 5CaO.5SiO$_2$.H$_2$O, said structures being integrated with each other and drying said product.

5. Method of making a new hydrous calcium silicate product comprising the steps of dispersing finely divided reactive lime and finely divided reactive silica in the form of quartz, in the molecular proportions of approximately from 4 to 5 to less than 5 to 5, the amount of water in the mixture being within the range of about 7.0 to .75 times the aggregate weight of the solids, and wherein the dispersion is maintained by finely divided fibers, and subjecting the said dispersion to temperatures and pressures within the range from 150° C. and 69 p. s. i. abs. to approximately 203° C. and 240 p. s. i. abs. respectively for a period of time varying with respect to temperature, to effect substantially quantitative reaction between the said reactive lime and reactive silica components to form in integrated form a hydrous calcium silicate having the formula 4CaO.5SiO$_2$.5H$_2$O and a hydrous calcium silicate having the formula 5CaO.5SiO$_2$.H$_2$O.

6. The method of forming an integrated hydrous calcium silicate product which comprises providing an aqueous slurry consisting essentially of solids in the form of reactive lime, reactive silica and a suspension agent for said solids in the form of highly spiculated fibers, wherein the initial molar ratio of lime to silica is at least 0.8 but less than 1.0, the amount of water in the mixture being within the range of about 7.0 to .75 times the aggregate weight of the solids, subjecting said slurry to a temperature and pressure in excess of 175° C. and 130 p. s. i. abs. respectively, maintaining said slurry at a temperature and for a period of time necessary to effect substantially quantitative reaction between the reactive lime and silica components, thereby to produce a crystalline end product containing a crystalline compound in integrated form, the percentage of such compound present in said end product being dependent upon the initial molar ratio of lime to silica in the slurry, the one said crystalline compound having the composition 4CaO.5SiO$_2$.5H$_2$O and drying said product.

7. The method according to claim 6 wherein said compound has integrated therewith, a crystalline compound having the composition 5CaO.5SiO$_2$.H$_2$O formed upon any upward variation of said initial molar ratio above 0.8.

8. A reaction product, comprising dispersed finely divided fibers and dispersed thin platy crystals, having a composition of 4CaO.5SiO$_2$.5H$_2$O and presenting a surface area of at least approximately 50 square meters per gram, said fibers and crystals being in continuous random arrangement relative to each other.

9. A hydrous calcium silicate, having the chemical composition represented by the formula 4CaO.5SiO$_2$.5H$_2$O which is further characterized by being of lamellar crystalline structure, free from extraneous water, lime and silica and free from other reaction products thereof.

10. Method of making a new hydrous calcium silicate, comprising the steps of dispersing finely divided reactive lime and finely divided reactive silica in the form of quartz, in the molecular proportions of approximately 4 to 5, in water, the water to solids ratio being not more than 26:1 by volume under saturated conditions relative to the lime component in solution, and wherein the dispersion is maintained by finely divided fibers, and subjecting the said dispersion to temperatures within the range from 150° C., to approximately 200° C., while maintaining the dispersion substantially quiescent during the reaction for a period of time varying with respect to temperature, to effect substantially quantitative reaction between the said reactive lime and reactive silica components both to form a hydrous calcium silicate having the formula 4CaO.5SiO$_2$.5H$_2$O and to integrate the same.

11. A hydrous calcium silicate, having the chemical composition represented by the formula 4CaO·5SiO$_2$·5H$_2$O which is further characterized by being of lamellar crystalline structure, in the form of integrated crystals, free from extraneous water, lime and silica and free from other reaction products thereof.

12. The reaction product having the composition 4CaO.5SiO$_2$·5H$_2$O and free from unreacted lime, in the form of thin platy crystals presenting a surface area of approximately 50 square meters per gram and characterized by a unique X-ray diffraction pattern having a very strong line at $d=11.2$ Å. and a strong line at $d=2.95$ Å. and further characterized by being integrated and by an endothermic reaction at 260°±10°—C.

13. The method of forming a shaped integrated hydrous calcium silicate product which comprises providing an aqueous slurry consisting essentially of solids in the form of reactive lime, reactive silica and water, wherein the initial molar ratio of lime to silica is above 4:5 but less than 5:5, the amount of water in the mixture being not greater than about 7.0 times the aggregate weight of the solids, molding said slurry, subjecting said molded slurry to a minimum temperature and pressure of about 175° C. and 130 p. s. i. abs. respectively, maintaining said slurry at said temperature and for a period of time consonant with the particular molecular ratio of the solids existing therein to effect substantially quantitative reaction between the reactive lime and silica components thereof, thereby to produce a crystalline end product containing a crystalline compound in integrated form, the percentage of such compound present in said end product being dependent upon the initial molar ratio of lime to silica in the slurry, the said crystalline compound having the composition 4CaO·5SiO$_2$·5H$_2$O and drying said product.

14. The method according to claim 13 wherein said compound has integrated therewith, a crystalline compound having the composition 5CaO·5SiO$_2$·H$_2$O formed upon any upward variation of said initial molar ratio above 4:5.

15. Method of making a new hydrous calcium silicate, comprising the steps of dispersing finely divided reactive lime and finely divided reactive silica in the form of quartz, in the molecular proportions of approximately 4 to 5, in water, the water to solids ratio being not more than 26:1 by volume under saturated conditions relative to the lime component in solution, and subjecting the said dispersion to temperatures within the range from 150° C., to approximately 200° C., while maintaining the dispersion substantially quiescent during the reaction for a period of time varying with respect to temperature, to effect substantially quantitative reaction between the said reactive lime and reactive silica components both to form a hydrous calcium silicate having the formula 4CaO·5SiO$_2$·5H$_2$O and to integrate the same.

16. Method of making a new hydrous calcium silicate comprising the steps of dispersing finely divided reactive lime and finely divided reactive silica in the form of quartz, in the molecular proportions of approximately 4 to 5, in at least seven times their aggregate volume of water, under saturated conditions relative to the lime component in solution, and subjecting the said dispersion to agitation and to temperatures within the range from 125° C., to approximately 200° C., for a period of time varying with respect to temperature, to effect substantially quantitative reaction between the said reactive lime and reactive silica components to form a hydrous calcium silicate having the formula 4CaO·5SiO$_2$·5H$_2$O.

GEORGE L. KALOUSEK.

References Cited in the file of this patent

UNITED STATES PATENTS

| Number | Name | Date |
|---|---|---|
| 2,215,891 | Thompson et al. | Sept. 24, 1940 |
| 2,469,379 | Fraser | May 10, 1949 |

OTHER REFERENCES

Flint et al.: "Formation of Hydrated Calcium Silicates at Elevated Temperatures and Pressures," N. B. S. Jour. of Research, vol. 21, pages 617–638.

Flint et al.: "X-ray Patterns of Hydrated Calcium Silicates," N. B. S. Jour. of Research, vol. 31, pages 225–228.